(12) United States Patent
Pernyeszi

(10) Patent No.: US 6,222,744 B1
(45) Date of Patent: Apr. 24, 2001

(54) ISOLATED POWER SUPPLY CIRCUIT FOR A FLOATING GATE DRIVER

(75) Inventor: Joseph Pernyeszi, Scotts Valley, CA (US)

(73) Assignee: General Electronics Applications, Inc., Scotts Valley, CA (US)

( * ) Notice: Subject to any disclaimer, the term of this patent is extended or adjusted under 35 U.S.C. 154(b) by 0 days.

(21) Appl. No.: 09/526,076

(22) Filed: Mar. 15, 2000

Related U.S. Application Data

(60) Provisional application No. 60/125,503, filed on Mar. 19, 1999.

(51) Int. Cl.[7] ............................................ H02M 1/12
(52) U.S. Cl. .................................. 363/41; 363/49
(58) Field of Search .......................... 363/49, 40, 131, 363/41

(56) References Cited

U.S. PATENT DOCUMENTS

| | | | |
|---|---|---|---|
| 5,550,436 | * 8/1996 | Houk | 363/49 |
| 5,612,860 | * 3/1997 | Meszlenyi | 363/49 |
| 5,615,093 | * 3/1997 | Nalbant | 323/235 |
| 5,892,673 | * 4/1999 | Delgado et al. | 363/138 |
| 5,940,287 | * 8/1999 | Brkovic | 363/127 |

* cited by examiner

*Primary Examiner*—Shawn Riley
(74) *Attorney, Agent, or Firm*—Townsend and Townsend and Crew LLP

(57) ABSTRACT

A drive circuit that provides isolated power for gate drivers of IGBT and DMOS transistors used in inverters. The drive circuit provides power to an isolated gate driver that receives a control voltage, and in response to the control voltage, uses the power from the drive circuit to output a gate control signal that is coupled to an isolated gate bipolar transistor. The drive circuit includes a start-up circuit coupled to a supply voltage, a resonant circuit coupled to the start-up circuit and the supply voltage, and a rectifier circuit coupled to the start-up circuit and the resonant circuit, and having logic to output a power signal that is coupled to the isolated gate driver, the rectifier circuit is also coupled to the isolated gate driver at a common node.

7 Claims, 4 Drawing Sheets

ISOLATED POWER SUPPLY CIRCUIT FOR A FLOATING GATE DRIVER

CROSS-REFERENCES TO RELATED APPLICATIONS

This application claims priority from co-pending U.S. Provisional Patent Application Ser. No. 60/125,503, filed Mar. 19, 1999, the disclosure of which is incorporated herein in its entirety for all purposes.

FIELD OF THE INVENTION

This invention relates to the field of power supplies, and more particularly, to a power supply drive circuit for use with isolated gate drivers.

BACKGROUND OF THE INVENTION

A gate driver is an interface circuit used to provide a control voltage (and resulting current) to dual metal oxide semiconductor (DMOS) and insulated gate bipolar transistor (IGBT) devices used to drive motors and other devices. During operation, the gate driver input can be driven with either a logic level signal or some other low level signal. A special kind of gate driver is an isolated gate driver, where isolation is provided between the input and output, but otherwise the circuit has all the characteristics of a typical gate driver.

Isolated gate drivers generally require isolated power supplies. When gate drivers are used in a motor drive circuit, six isolated power supplies might be used, with one per each IGBT used. The power supply increases the cost of the circuit and reduces the reliability of an already complicated circuit. The wiring attached at nodes with fast changing signals also acts as an antenna for radiating radio frequency interference (RFI), which is detrimental to both the internal circuitry and radio reception in the vicinity of the circuit. Two solutions that have been proposed in the past are the use of a DC/DC converter or a charge pump. The DC/DC converter has high efficiency (80%–90% conversion efficiency), but it is relatively large and expensive. The charge pump is simple and very economical, but has low (40%) efficiency.

SUMMARY OF THE INVENTION

One circuit according to the present invention simply, efficiently and economically provides isolated power for gate drivers of IGBT and DMOS transistors, such as those used in inverters for motor drivers (VSD), uninterruptible power systems (UPS), and other devices. The isolated gate power provided is floating with respect to ground (i.e. it is independent of the potentials at the control input to the gate driver, which may be connected to a microcontroller).

In one embodiment, an isolated gate driver receives a control voltage, and in response to the control voltage, uses power from a drive circuit to output a gate control signal that is coupled to an isolated gate bipolar transistor. The drive circuit comprises a start-up circuit coupled to a supply voltage, a resonant circuit coupled to the start-up circuit and the supply voltage, and a rectifier circuit coupled to the start-up circuit and the resonant circuit, and having logic to output a power signal that is coupled to the isolated gate driver. The rectifier circuit is also coupled to the isolated gate driver at a common node.

A further understanding of the nature and advantages of the present invention may be realized by reference to the remaining portions of the specification and the drawings.

DESCRIPTION OF THE SPECIFIC EMBODIMENTS

Figure 1:
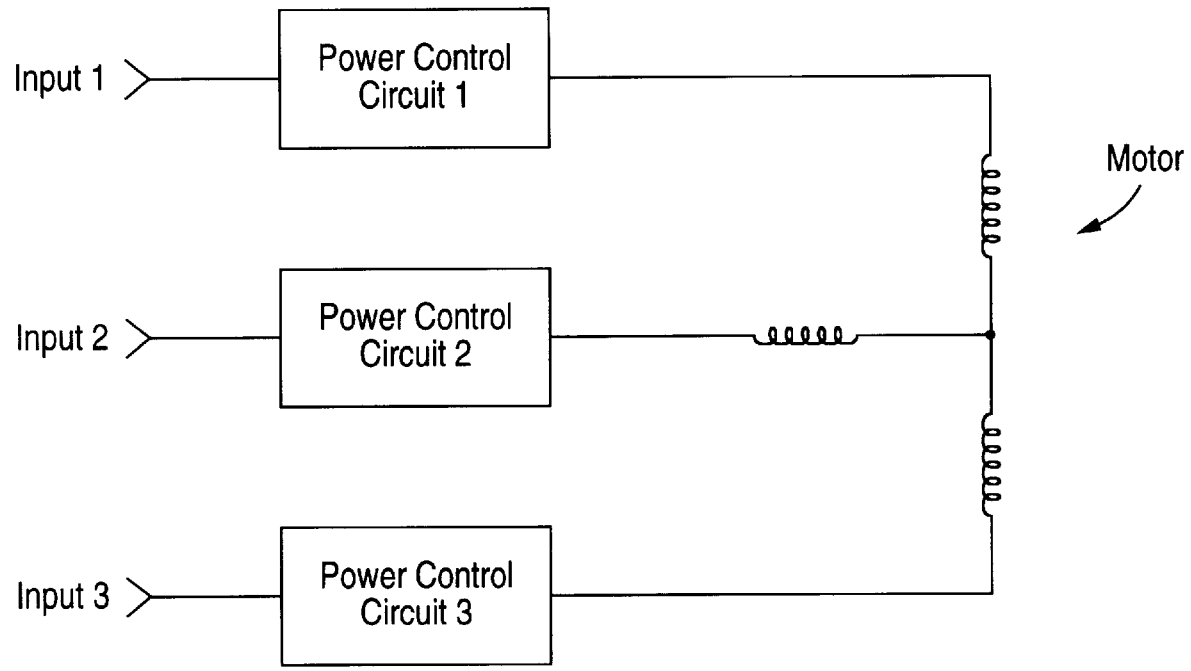
FIG. 1 shows a block diagram of three power control circuits, constructed in accordance with the present invention, that are used to drive a motor.

FIG. 1 shows three power control circuits (1, 2, 3) constructed in accordance with the present invention for driving a motor. The power control circuits incorporate embodiments of the present invention as described in further detail below. The power control circuits receive inputs (1, 2, 3) from a motor controller (not shown) and produce outputs to drive the motor elements.

Figure 2:
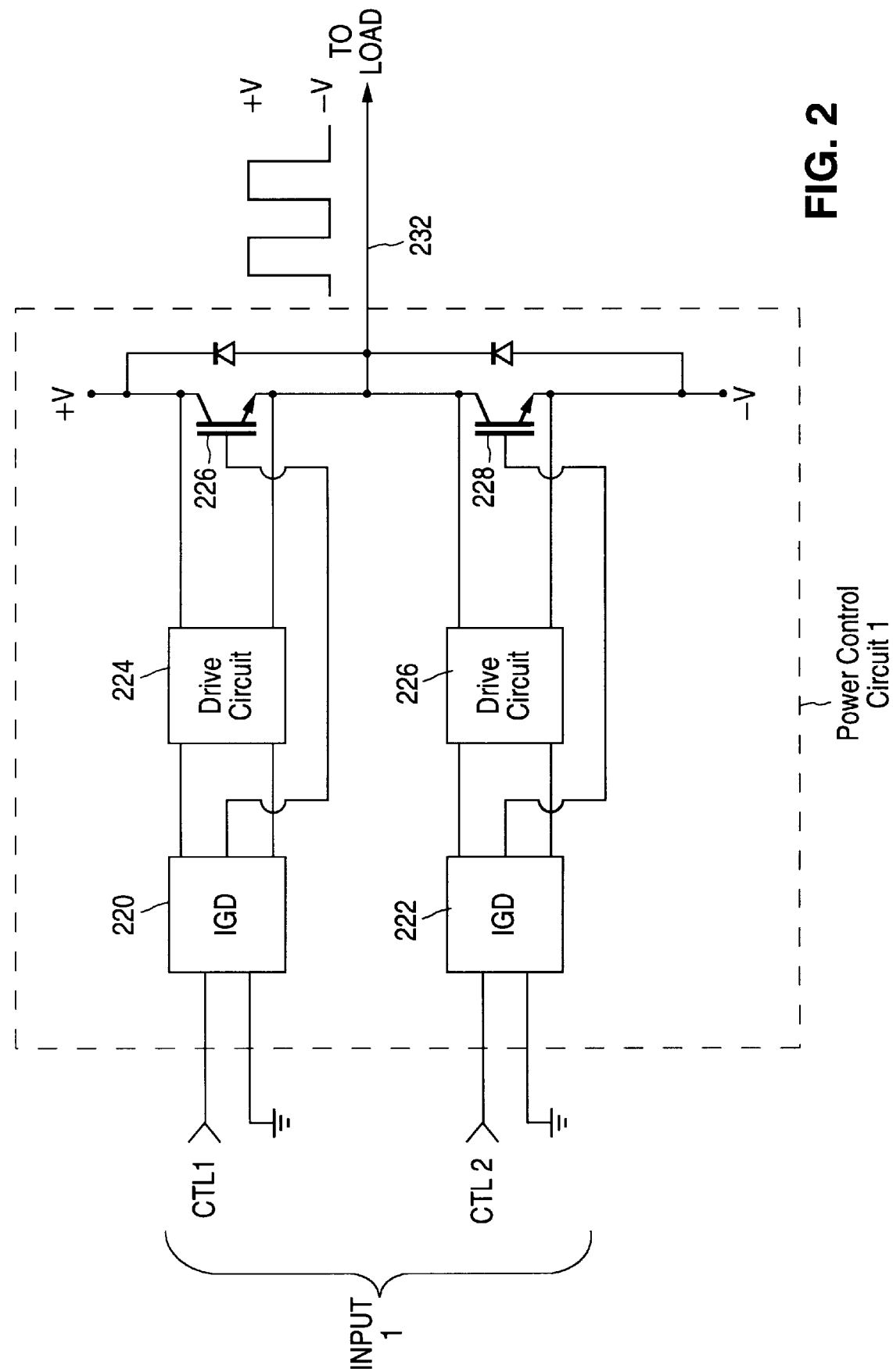
FIG. 2 shows a block diagram of a power control circuit of FIG. 1.

FIG. 2 shows a detailed view of power control circuit 1 of FIG. 1. Since the power control circuits 2 and 3 are similar to power control circuit 1, they will not be discussed in detailed. The power control circuit 1 receives, at input 1, two control signals (Ctl 1 and Ctl 2). The control signals are coupled to two isolated gate drivers (IGD) 220 and 222. The two IGD are coupled to two drive circuits (224 and 226) that are constructed in accordance with the present invention. Two isolated gate bipolar transistors (228 and 230) are coupled to the two drive circuits (224 and 226) and the isolated gate drivers (220 and 222) to produce an output 232, which may be coupled to a load, such at one element of the motor of FIG. 1.

Figure 3:
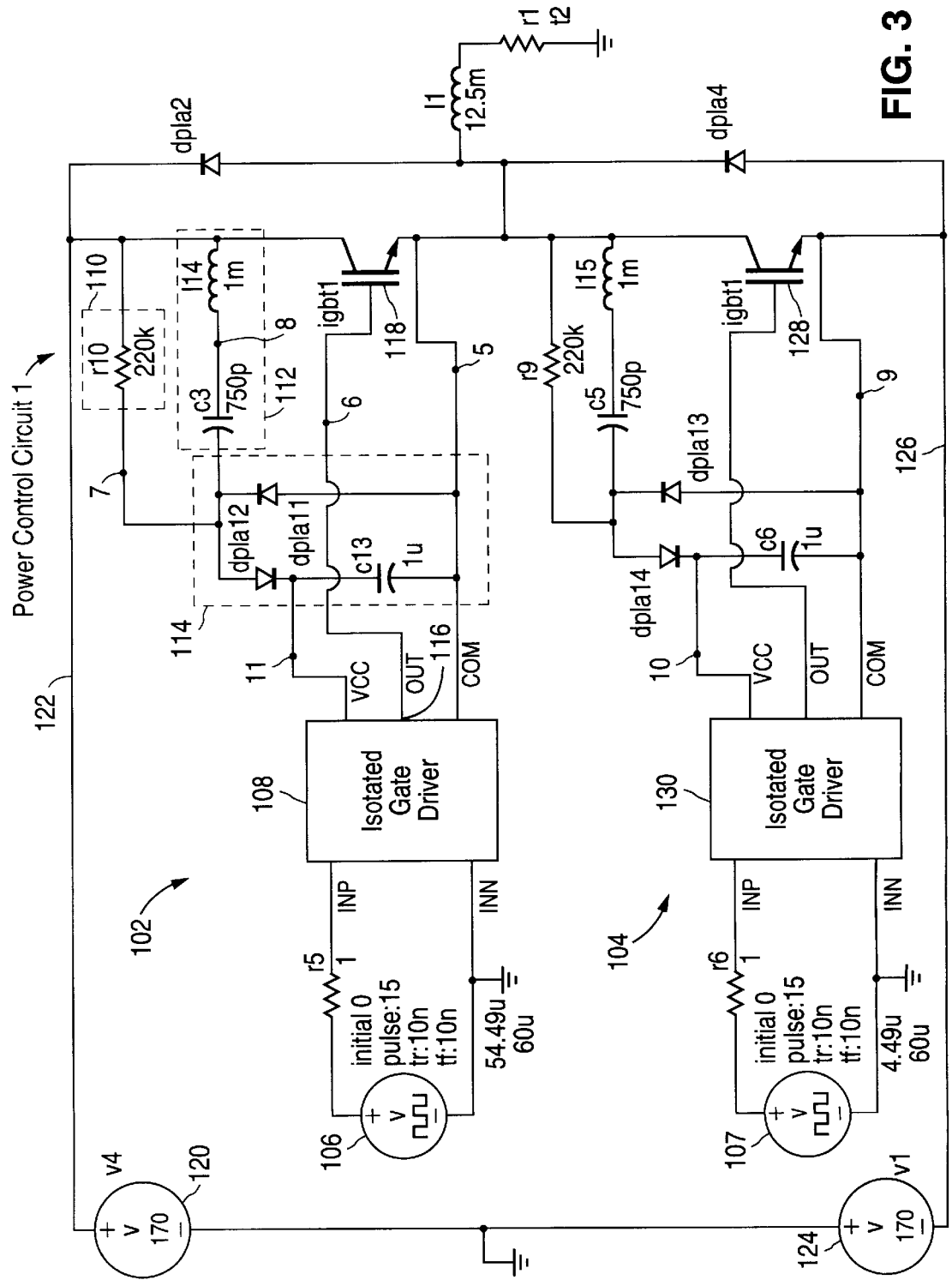
FIG. 3 is a detailed schematic diagram of the power control circuit of FIG. 2.

FIG. 3 is a schematic diagram of the power control circuit 1 of FIG. 2. The circuit 1 uses the "resonant converter" principle, to provide high conversion efficiency with a simple and economical solution. Preferably, the circuit 1 comprises an upper circuit 102 and a lower circuit 104 made up of the same component values, in which case only one of the two circuits need be described in detail. In the circuit 1, resistor R10, inductor L14, capacitor C13, diode dp1a12, dode dp1a11 and capacitor C3 provide power for an upper gate driver 108, and resistor R9, inductor L15, capacitor C6, diode dp1a13, diode dp1a14 and capacitor C5 provide power for a lower gate driver 130.

The upper circuit 102 includes a control voltage 106, the upper gate driver circuit 108, a start-up circuit 110, a resonance converter 112 and a rectifier circuit 114. An output 116 of the gate driver 108 is coupled to IGBT 118. The upper circuit 102 is coupled to a first power supply 120 via a positive supply rail 122, while the lower circuit 104 is coupled to a second power supply 124 at IGBT 128 via a negative supply rail 126. The control voltage 106 represents the Ctl 1 voltage of FIG. 2, which may be derived from a microcontroller or other circuitry.

The control voltage 106 can be adjusted to have selectable pulse widths (i.e. on times and off times), so that the output of the circuit, (at node 5) can be controlled by the selected on and off times. The control voltage 106 and control voltage 107 can be adjusted so that the upper circuit 102 and the lower circuit 104 have alternating on and off time with little or no overlap, thus allowing the output to mimic the input. The control voltages 106, 107 may have voltage levels of only a few volts, while the output at node 5 may provide similar waveforms having much higher voltage levels.

The circuit 1 can be described with reference to a start-up condition and a steady state condition. At start-up, the power for the gate driver 108 is supplied by resistor R10 of the start-up circuit 110. After start-up, the resonant converter 112 takes over and will supply the power, which is higher than the startup power. The gate driver 108 requires less power at start up and more power during its steady state (running) condition. After the IGBTs (118, 128) start switching, they will generate a square wave at node 5 derived from the control voltage inputs. The voltage across IGBT1 118 will be the difference in voltage between the positive rail 102 (+170 V) and node 5. The amplitude of the square wave at node 5 is 340 V, which is also the input for the resonant converter 112. When the voltage switches from 0 V to 340 V, current will start flowing through inductor L14, C3, dp1a12 and will charge C13 to a positive voltage. The above current will charge the positive terminal of C3 to above 340 V. At that point, current will start flowing in the reverse direction. At the same time, the current loop is closed through diode dp1a11. In the next half cycle, the current reverses again and flows through diode dp1a11, again charging C13. This oscillation continues until the energy in the series resonant converter 112 (L14, C3) is transferred to C13.

The power required to switch the IGBT 118 is proportional to the switching frequency and the power delivered by the resonant converter 112 is also proportional to the switching frequency. Resonant converters, such as resonant converter 112, are driven by pulse waveforms (in one case the pulse waveform is a square wave) with short rise and fall times. Current will flow through series LC network (LI4, C3) and the load at each transition of the drive signal. The circuit resonates at its natural frequency which is higher than the pulse frequency. Since energy transfer takes place at the transitions, the output power is proportional to frequency. This provides desirable tracking between power needed and power provided.

Figure 4:
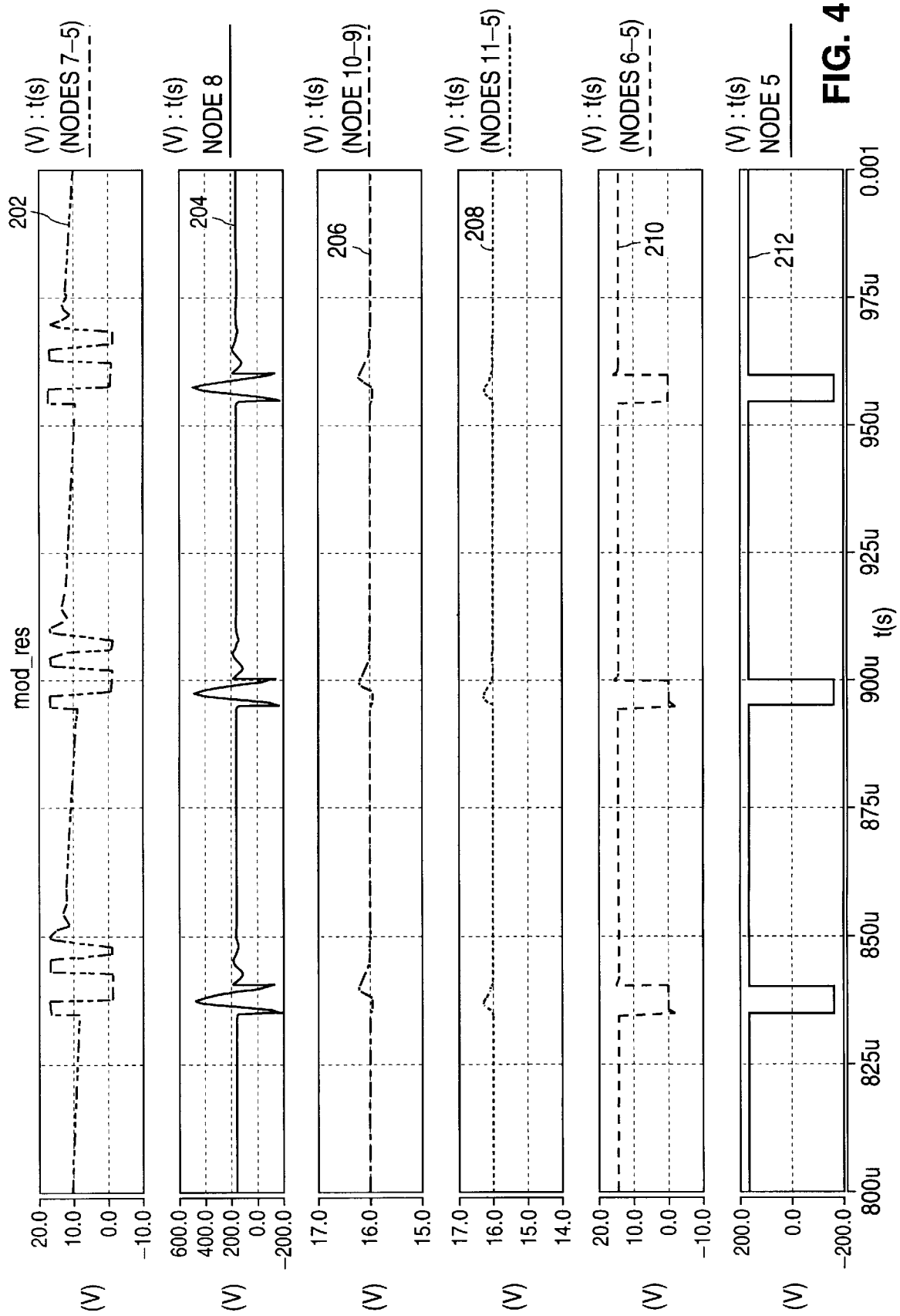
FIG. 4 is a timing diagram showing signal waveforms at various nodes resulting from operation of the power control circuit of FIG. 3.

FIG. 4 shows signal waveforms associated with the operation of the circuit of FIG. 3. The waveforms in FIG. 4 show voltage amplitude plotted against time (in microseconds) for various nodes in FIG. 3. For example, waveform 202 shows the voltage between nodes 7 and 5, waveform 204 shows the voltage at node 8, waveform 206 shows the voltage between nodes 10 and 9, waveform 208 shows the voltage between nodes 11 and 5, waveform 210 shows voltage between nodes 6 and 5, and waveform 212 shows the voltage at node 5. The waveform 212 is similar to the waveform of the control voltage 106, however, the control voltage levels are much smaller (0–15 volts).

Figure 5:
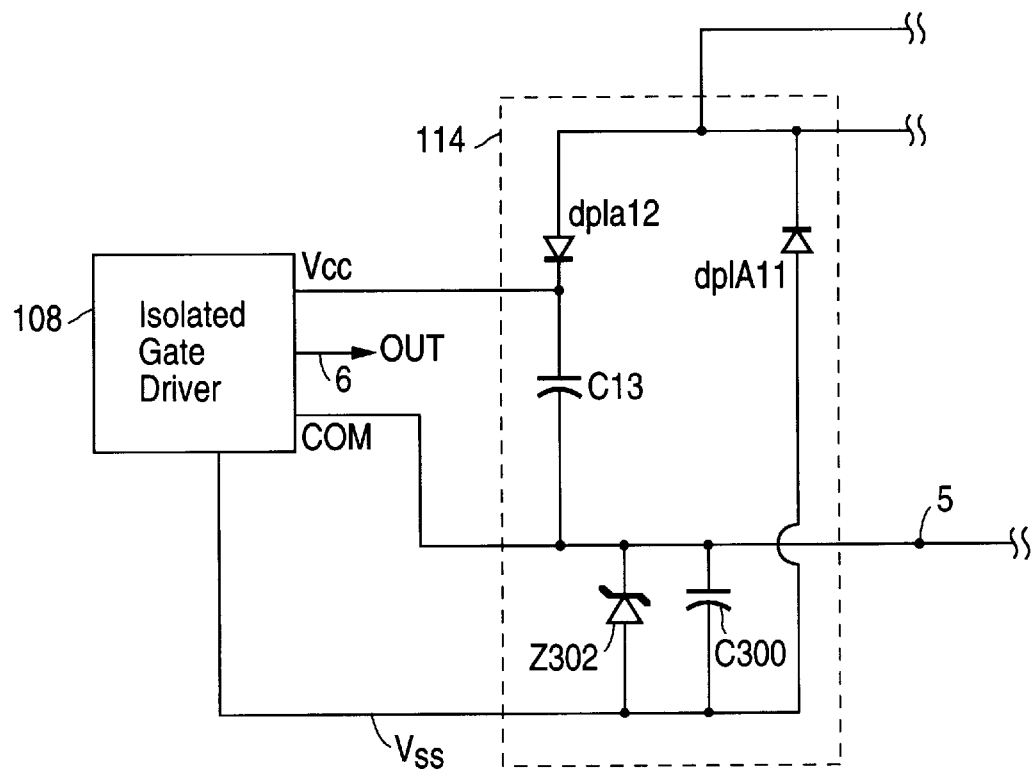
FIG. 5 is a schematic diagram of a rectifier circuit constructed in accordance with another embodiment of the present invention.

FIG. 5 shows another embodiment of the rectifier circuit 114, that may be used to provide negative gate drive if required. For clarity, only the relevant portions of the schematic of FIG. 3 are repeated in FIG. 5.

In the rectifier circuit 114, the diode dp1a11 is not returned to the common node (5), but instead is coupled to another capacitor C300. The opposite terminal of capacitor C300 is coupled to the common node 5. Thus, a negative node Vss is formed as shown in FIG. 5. A zener diode Z302 is also coupled between the common 5 and the Vss. The gate driver 108 is also coupled to the Vss. As a result, the gate driver output 116 may provide both positive and negative control voltages. In one embodiment, the zener may have a breakdown voltage in the range of approximately 6 to 8 volts.

The present invention provides a low cost circuit for a power supply that avoids excessive wiring and can be located at the junction of the gate driver and the IGBT. It will be apparent to those with skill in the art that modifications to the above methods and embodiments can occur without deviating from the scope of the present invention. Accordingly, the disclosures and descriptions herein are intended to be illustrative, but not limiting, of the scope of the invention which is set forth in the following claims.

What is claimed is:

1. A drive circuit for providing power to an isolated gate driver, wherein the isolated gate driver receives a control voltage, and in response to the control voltage, uses the power from the drive circuit to output a gate control signal that is coupled to an isolated gate bipolar transistor, the drive circuit comprising:

a start-up circuit coupled to a supply voltage;

a resonant circuit coupled to the start-up circuit and the supply voltage; and a rectifier circuit coupled to the start-up circuit and the resonant circuit and having logic to output a power signal that is coupled to the isolated gate driver, the rectifier is also coupled to the isolated gate driver and the isolated gate bipolar transistor at a common node, and wherein the rectifier forms a bi-directional current path between the resonant circuit and the common node.

2. The drive circuit of claim 1, wherein the start-up circuit is a resistor having a first terminal coupled to the supply voltage and a second terminal coupled to the resonant circuit and the rectifier circuit.

3. The drive circuit of claim 1, wherein the resonant circuit comprises:

an inductor coupled to the supply voltage; and a capacitor coupled to the inductor, the start-up circuit and the rectifier circuit.

4. The drive circuit of claim 1, wherein the rectifier circuit comprises:

a first diode having a first cathode coupled to the start-up circuit and the resonant circuit, and having a first anode coupled to the common node;

a second diode having a second anode coupled to the start-up circuit, the resonant circuit, and the first cathode, the second diode having a second cathode coupled to the power node for providing power to the isolated gate driver; and a capacitor having a first capacitor terminal coupled to the power node and a second capacitor terminal coupled to the common node.

5. A drive circuit for providing power to an isolated gate driver, wherein the isolated gate driver receives a control voltage, and in response to the control voltage, uses the power from the drive circuit to output a gate control signal that is coupled to an isolated gate bipolar transistor, the drive circuit comprising:

a start-up circuit coupled to a supply voltage;

a resonant circuit coupled to the start-up circuit and the supply voltage; and a rectifier circuit coupled to the start-up circuit and the resonant circuit and having logic to output a power signal that is coupled to the isolated gate driver, the rectifier is also coupled to the isolated gate driver at a common node, and wherein the rectifier includes:

a first diode having a first cathode coupled to the start-up circuit and the resonant circuit, and having a first anode terminal;

a first capacitor coupled between the first anode terminal and the common node;

a second diode having a second anode coupled to the start-up circuit, the resonant circuit, and the first cathode, the second diode having a second cathode coupled to the power node for providing power to the isolated gate driver; and a second capacitor coupled between the second the power node and the common node; and a zener diode coupled between the common node and the first anode, wherein the coupling to the first anodes creates a Vss node which is also coupled to the isolated gate driver.

6. The drive circuit of claim 5, wherein the isolated gate bipolar transistor is replaced with a DMOS transistor.

7. The drive circuit of claim 1, wherein the isolated gate bipolar transistor is replaced with a DMOS transistor.

* * * * *